(12) United States Patent
Shizuku et al.

(10) Patent No.: US 12,081,070 B2
(45) Date of Patent: Sep. 3, 2024

(54) PUMP

(71) Applicant: NIDEC TOSOK CORPORATION, Kanagawa (JP)

(72) Inventors: Yoshiyuki Shizuku, Kanagawa (JP); Shigehiro Kataoka, Kanagawa (JP); Takanobu Yahata, Kanagawa (JP); Thao Lethithanh, Kanagawa (JP); Nguyen Thi Thanh Tam, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 146 days.

(21) Appl. No.: 17/858,072

(22) Filed: Jul. 6, 2022

(65) Prior Publication Data

US 2023/0012331 A1 Jan. 12, 2023

(30) Foreign Application Priority Data

Jul. 12, 2021 (JP) .................................. 2021-115272

(51) Int. Cl.
*F04C 2/10* (2006.01)
*H02K 1/16* (2006.01)
*H02K 1/22* (2006.01)
*H02K 5/08* (2006.01)
*H02K 7/14* (2006.01)

(52) U.S. Cl.
CPC ................. *H02K 1/16* (2013.01); *F04C 2/10* (2013.01); *H02K 1/22* (2013.01); *H02K 5/08* (2013.01); *H02K 7/14* (2013.01); *F04C 2240/40* (2013.01)

(58) Field of Classification Search
CPC ......... F04C 2/10; F04C 2240/40; H02K 1/16; H02K 1/22; H02K 5/08; H02K 7/14
See application file for complete search history.

(56) References Cited

U.S. PATENT DOCUMENTS

| 10,941,782 B2* | 3/2021 | Vestergaard Kragelund ............... F04D 29/086 |
| 2013/0195696 A1 | 8/2013 | Sugimura et al. |
| 2018/0097421 A1* | 4/2018 | Abe ......................... H02K 3/32 |
| 2019/0199149 A1* | 6/2019 | Oikawa .................. H02K 1/146 |

* cited by examiner

*Primary Examiner* — Connor J Tremarche
(74) *Attorney, Agent, or Firm* — HAUPTMAN HAM, LLP (57) ABSTRACT

One aspect of a pump of the present invention includes a rotor rotatable about a central axis, a stator assembly located radially outside the rotor and surrounding the rotor, a pump unit connected to a first side in an axial direction of the rotor, a support member including a rotor accommodating portion, the rotor accommodating portion being located radially inside the stator assembly and accommodates the rotor therein, and a resin housing in which the stator assembly and the support member are molded. The rotor accommodating portion includes a lid portion that covers the rotor from a second side in the axial direction, and a tubular portion that is located between the rotor and the stator assembly in a radial direction and is open to the first side in the axial direction. The stator assembly includes a stator core having an annular shape, a plurality of coils mounted on the stator core, and a stator cover that covers the plurality of coils.

4 Claims, 8 Drawing Sheets

PUMP

CROSS-REFERENCE TO RELATED APPLICATIONS

The present invention claims priority under 35 U.S.C. § 119 to Japanese Patent Application No. 2021-115272 filed on Jul. 12, 2021, the entire content of which is incorporated herein by reference.

FIELD OF THE INVENTION

The present invention relates to a pump.

BACKGROUND

An electric pump in which a motor unit and a pump unit are integrated in advance has been developed. Conventionally, there is known a pump in which a motor unit and a pump unit are integrated, the pump having a structure in which a stator is molded in order to ensure waterproofness of the stator.

As described above, when a stator is molded, molding resin and a coil are in direct contact with each other. For this reason, a coil wire may have been damaged by heat and injection pressure during molding of the mold resin.

SUMMARY

One aspect of an exemplary pump of the present invention includes a rotor rotatable about a central axis, a stator assembly located radially outside the rotor and surrounding the rotor, a pump unit connected to a first side in an axial direction of the rotor, a support member including a rotor accommodating portion, the rotor accommodating portion being located radially inside the stator assembly and accommodating the rotor therein, and a resin housing in which the stator assembly and the support member are molded. The rotor accommodating portion includes a lid portion that covers the rotor from a second side in the axial direction, and a tubular portion that is located between the rotor and the stator assembly in a radial direction and is open to the first side in the axial direction. The stator assembly includes a stator core having an annular shape, a plurality of coils mounted on the stator core, and a stator cover that covers the plurality of coils.

The above and other elements, features, steps, characteristics and advantages of the present disclosure will become more apparent from the following detailed description of the preferred embodiments with reference to the attached drawings.

DETAILED DESCRIPTION

Each diagram virtually illustrates a central axis J in a pump 1 of an embodiment described below. In description below, the axial direction of the central axis J is simply referred to as the "axial direction". A radial direction around the central axis J is simply referred to as the "radial direction". A circumferential direction around the central axis J is simply referred to as the "circumferential direction". A Z axis illustrated in each diagram indicates a direction in which the central axis J extends. In description below, the side of the axial direction to which an arrow of the Z axis is directed (+Z side) is referred to as the "upper side", and the side of the axial direction opposite to the side to which the arrow of the Z axis is directed (−Z side) is referred to as the "lower side".

In the present embodiment, the lower side corresponds to the "first side in the axial direction", and the upper side corresponds to the "second side in the axial direction". Note that the upper side and the lower side are simply terms for describing a relative positional relationship of components, and an actual arrangement relationship and the like may be an arrangement relationship and the like other than the arrangement relationship and the like indicated by these terms.

Figure 1:
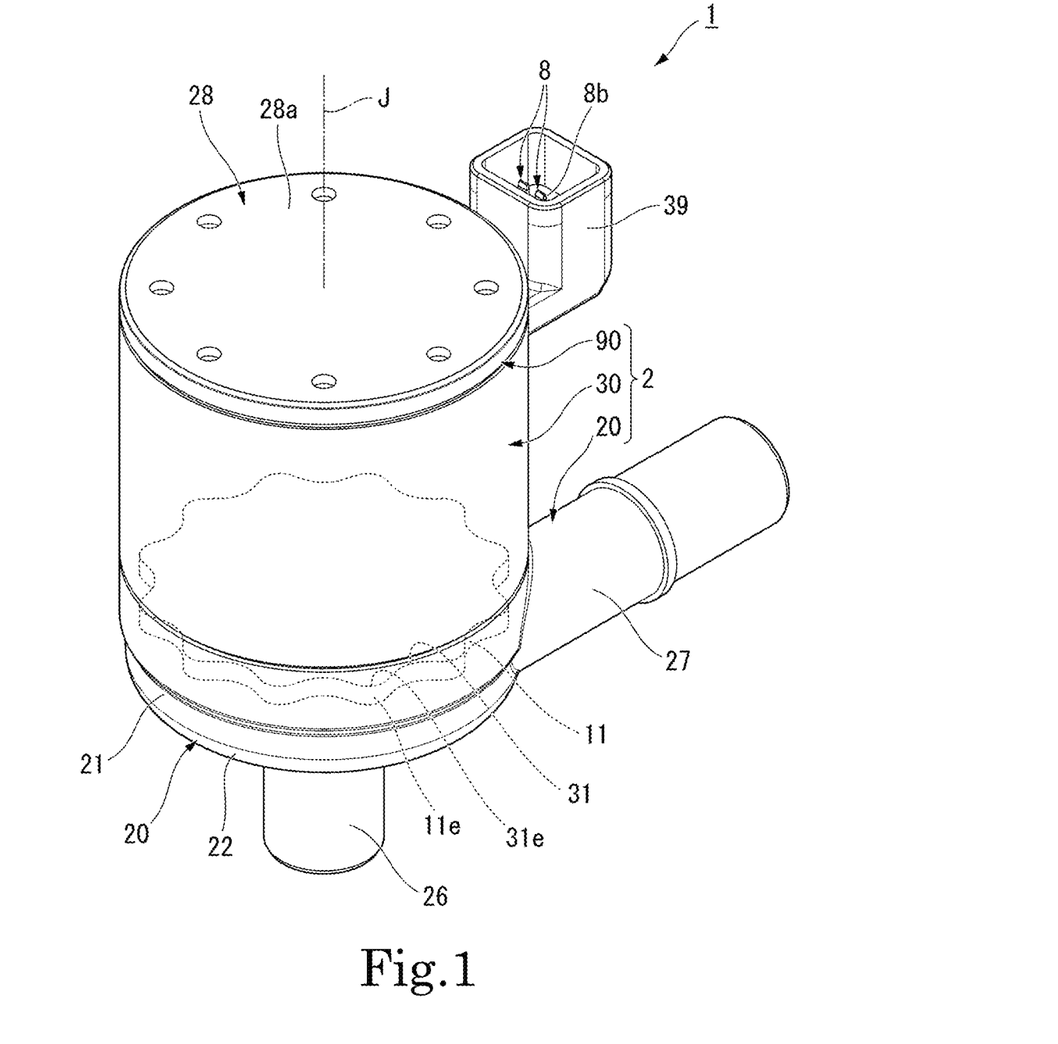
FIG. 1 is a perspective view of a pump according to an embodiment.
Figure 2:
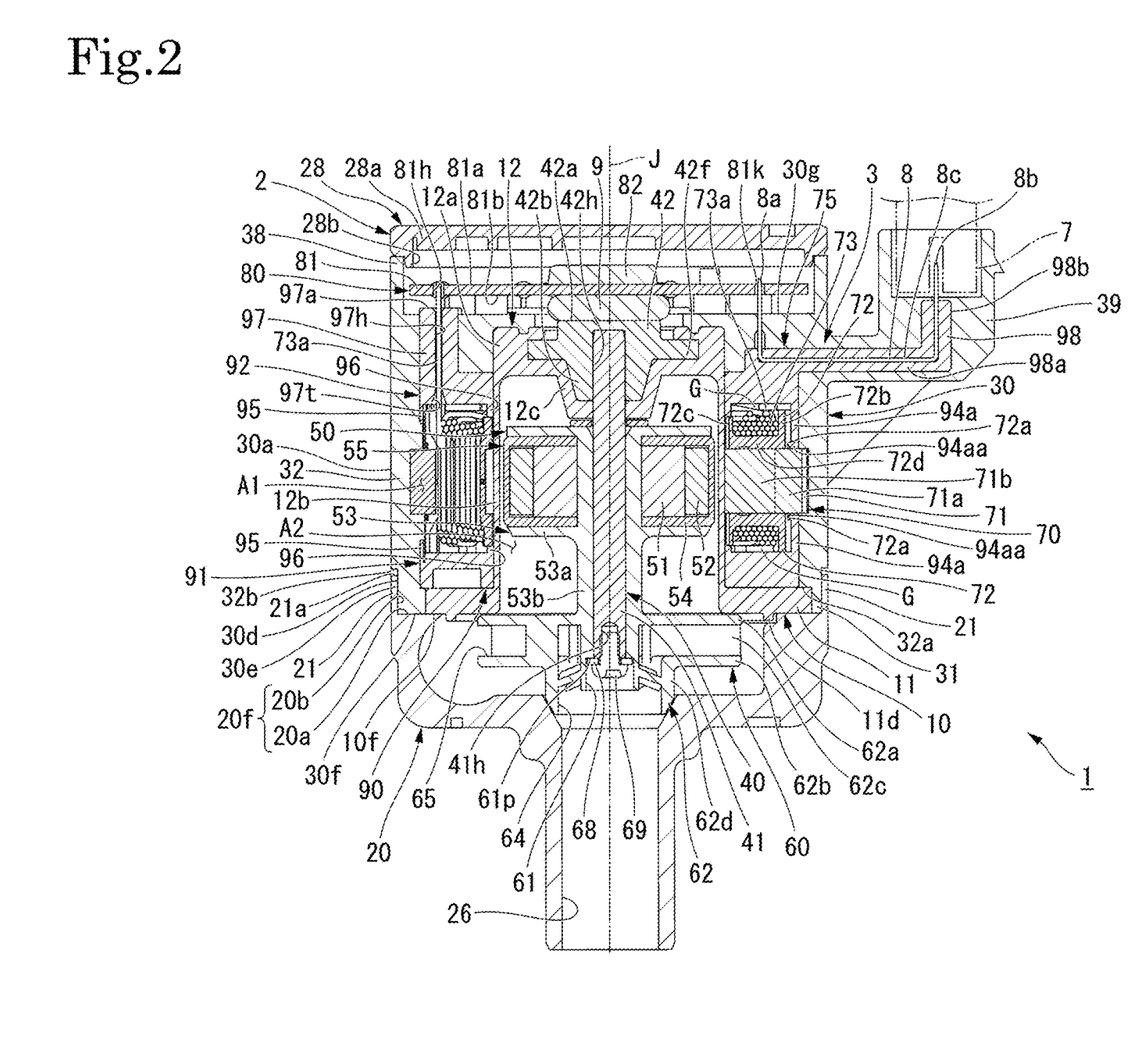
FIG. 2 is a cross-sectional view of the pump according to the embodiment.

FIG. 1 is a perspective view of the pump 1. FIG. 2 is a cross-sectional view of the pump 1. FIGS. 3, 4, 5, and 6 are enlarged views each enlarging a part of FIG. 2. In FIG. 2, for the sake of explanation, cross sections at different circumferential positions on both the left and right sides of the central axis J are illustrated.

As illustrated in FIG. 2, the pump 1 of the present embodiment includes a motor 3, a pump unit 60, a support member 10, a fixed shaft 40, a circuit board 80, and a case 2. The motor 3 includes a rotor 50 rotatable about the central axis J, and a stator assembly 75 located radially outside the rotor 50 and surrounding the rotor 50. That is, the pump 1 includes the rotor 50 and the stator assembly 75.

The pump 1 of the present embodiment is a water pump that sends water. The pump 1 discharges water (liquid) sucked from an inlet pipe 26 from an outlet pipe 27 (see FIG. 1) by rotating the pump unit 60 by the motor 3.

As illustrated in FIG. 2, the case 2 accommodates the motor 3, the pump unit 60, the support member 10, the fixed shaft 40, and the circuit board 80. The inside of the case 2 is divided into a flow path region A2 through which water (liquid) passes and a waterproof region A1 sealed from water. The rotor 50, the fixed shaft 40, and the pump unit 60 are arranged in the flow path region A2. In the waterproof region A1, the stator assembly 75 and the circuit board 80 are arranged. The flow path region A2 and the waterproof region A1 are defined by the support member 10.

The case 2 includes a resin housing (motor housing) 30, a substrate cover 28, and a pump cover 20. That is, the pump 1 includes the resin housing 30, the substrate cover 28, and the pump cover 20. The substrate cover 28 is joined to an upper end portion of the resin housing 30. On the other hand, the pump cover 20 is joined to a lower end portion of the resin housing 30. In this manner, the resin housing 30, the substrate cover 28, and the pump cover 20 are fixed to each other.

The resin housing 30 includes an embedded portion 32 in which the stator assembly 75 and the support member 10 are embedded. That is, the resin housing 30 is formed by insert molding in which the stator assembly 75 and the support member 10 are inserted. In this manner, the resin housing 30 holds the stator assembly 75 and the support member 10.

The resin housing 30 surrounds the stator 70, the rotor 50, and a rotor accommodating portion 12 from radially outside.

As illustrated in FIG. 1, an outer peripheral surface 30a of the resin housing 30 is circular when viewed from the axial direction. A connector portion 39 is provided on the outer peripheral surface 30a of the resin housing 30. That is, the resin housing 30 has the connector portion 39. The connector portion 39 protects a terminal 8 connected to an external device 7.

As illustrated in FIG. 2, an upper end portion of the resin housing 30 is provided with a housing upper surface 30g facing upward and a surrounding tubular portion 38 extending upward from an outer edge of the upper surface 30g. On the other hand, a holding tubular portion 31 having a tubular shape around the central axis J is provided in a lower end portion of the resin housing 30. The resin housing 30 is joined to the substrate cover 28 at the surrounding tubular portion 38, and is joined to the pump cover 20 at the holding tubular portion 31.

The housing upper surface 30g faces the circuit board 80 in the vertical direction. The housing upper surface 30g is provided with a boss that supports the circuit board 80 from below. The surrounding tubular portion 38 has a cylindrical shape around the central axis J. The surrounding tubular portion 38 surrounds the circuit board 80 from radially outside.

The substrate cover 28 includes a cover main body 28a having a plate shape extending along a plane orthogonal to the central axis J, and a guide rib 28b provided on a lower surface of the cover main body 28a. The cover main body 28a has a circular shape around the central axis J. An outer diameter of the cover main body 28a substantially matches an outer diameter of the resin housing 30. The guide rib 28b extends along the circumferential direction. The guide rib 28b is arranged slightly further on the radially inner side than an outer edge of the cover main body 28a. An outer peripheral surface of the guide rib 28b is fitted to an inner peripheral surface of the surrounding tubular portion 38 of the resin housing 30. In this manner, the substrate cover 28 is positioned with respect to the resin housing 30.

A region located radially outside the guide rib 28b on a lower surface of the cover main body 28a is in contact with an upper end surface of the surrounding tubular portion 38 of the resin housing 30. A lower surface of the cover main body 28a and an upper end surface of the surrounding tubular portion 38 are welded to each other.

In a welding process, the substrate cover 28 is rotated while having a lower surface pressed against the resin housing 30. In the welding process, a contact portion between the substrate cover 28 and the resin housing 30 is melted by frictional heat and solidified to be joined. That is, the substrate cover 28 and the resin housing 30 are joined by spin welding. The substrate cover 28 and the resin housing 30 may be welded by other welding means such as ultrasonic welding and laser welding.

The circuit board 80 is arranged on the upper side (the second side in the axial direction) of the stator assembly 75. That is, the circuit board 80 is arranged on the upper side of the stator 70. The circuit board 80 is accommodated in a space surrounded by the radially inner side of the surrounding tubular portion 38 of the resin housing 30, the housing upper surface 30g, and the substrate cover 28.

The circuit board 80 includes a substrate main body 81 having a plate shape along a plane orthogonal to the central axis J, and a heat generating element 82 mounted on an upper surface 81a (surface on the second side in the axial direction) of the substrate main body 81. In addition to the heat generating element 82, the circuit board 80 includes a plurality of elements (not illustrated) mounted on the upper surface 81a or a lower surface 81b of the substrate main body 81.

The substrate main body 81 has a first through hole (through hole) 81h and a second through hole 81k penetrating in the thickness direction. That is, the circuit board 80 is provided with the first through hole 81h and the second through hole 81k. A coil wire 73a extending upward from the stator assembly 75 is inserted into the first through hole 81h and solder-connected to the substrate main body 81. A first end portion 8a of the terminal 8 is inserted into the second through hole 81k and solder-connected to the substrate main body 81. The plurality of first through holes 81h and the plurality of second through holes 81k are provided on the substrate main body 81.

The heat generating element 82 is arranged on the central axis J. The heat generating element 82 means an element that generates heat during operation and has a high temperature among elements mounted on the substrate main body 81. When the circuit board 80 has a plurality of elements, the heat generating element 82 generates a larger amount of heat than other elements. Examples of the heat generating element 82 include a switching element, a capacitor, a field effect transistor, a driver integrated circuit for driving a field effect transistor, and an integrated circuit for a power supply.

A support member (shield member) 10 is made from a non-magnetic material. In the present embodiment, the support member 10 is made from resin. The support member 10 includes the rotor accommodating portion 12 and a flange portion 11.

The rotor accommodating portion 12 is located radially inside the stator assembly 75. That is, the rotor accommodating portion 12 is located radially inside the stator 70. The rotor accommodating portion 12 has a cylindrical shape that surrounds the central axis J and opens downward. The rotor accommodating portion 12 accommodates the rotor 50 inside. The rotor accommodating portion 12 includes a lid portion 12a that covers the rotor 50 from above, and a tubular portion 12b that extends downward from the lid portion 12a.

The lid portion 12a has a disk shape with the central axis J at the center. The lid portion 12a covers the rotor 50 from the upper side (the second side in the axial direction). A holding portion 12c is provided at the center of the lid portion 12a when viewed from the axial direction. The holding portion 12c is a portion that holds an end portion on the upper side of the fixed shaft 40. The holding portion 12c protrudes more downward than other portions of the lid portion 12a.

The tubular portion 12b extends downward from a radially outer peripheral edge portion of the lid portion 12a and is connected to a radially inner peripheral edge portion of the flange portion 11. The tubular portion 12b is located between the rotor 50 and the stator assembly 75 in the radial direction. That is, the tubular portion 12b is located between the rotor 50 and the stator 70 in the radial direction. The tubular portion 12b opens downward.

According to the present embodiment, the rotor accommodating portion 12 accommodates the rotor 50 inside. Further, the rotor accommodating portion 12 includes the lid portion 12a that covers the rotor 50 from above, and the tubular portion 12b that surrounds the rotor 50 and opens downward. In this manner, the rotor accommodating portion 12 can seal the rotor 50 and the stator 70 with a space between them while securing a structure for connecting the pump unit 60 to the lower side of the rotor 50, and it is possible to prevent liquid (water) sent by the pump unit 60 from coming into contact with the stator 70.

The flange portion 11 has an annular shape surrounding the central axis J. The flange portion 11 extends radially outward from an end portion on the lower side (the first side in the axial direction) of the rotor accommodating portion 12. The flange portion 11 is located on the lower side of the stator 70. A surface (third contact surface 10f to be described later) facing the lower side of the flange portion 11 is welded to the pump cover 20.

An outer peripheral surface of the flange portion 11 is covered with the holding tubular portion 31 of the resin housing 30. That is, the holding tubular portion 31 comes into contact with an outer peripheral surface of the flange portion 11 at least at a part of an inner peripheral surface. In the present embodiment, the support member 10 is embedded in the resin housing 30 together with the stator assembly 75.

The flange portion 11 is embedded in the resin housing 30 at a part of an upper surface and an outer peripheral surface, and is exposed from the resin housing 30 at a lower surface. The resin housing 30 has a stepped surface 32a in a portion in which an upper surface of the flange portion 11 is embedded. That is, the resin housing 30 has the stepped surface 32a in contact with an upper surface (surface facing the second side in the axial direction) of the flange portion 11. The resin housing 30 axially supports the flange portion 11 on the stepped surface 32a.

As illustrated in FIG. 1, a plurality of protruding portions 11e arranged along the circumferential direction are provided on an outer peripheral surface of the flange portion 11. On an inner peripheral surface of the holding tubular portion 31, a plurality of recessed portions 31e into which the protruding portions 11e are inserted are provided. The recessed portion 31e is molded as molten resin surrounds an outer peripheral surface of the flange portion and fills the space between each protruding portion 11e during molding of the resin housing 30. For this reason, the protruding portion 11e and the recessed portion 31e are in close contact with each other.

A positioning rib 11d is provided on a lower surface (surface facing the first side in the axial direction) of the flange portion 11. The positioning rib 11d protrudes downward from a lower surface of the flange portion 11. The positioning rib 11d extends along the circumferential direction around the central axis J. An outer peripheral surface of the positioning rib 11d facing radially outward is fitted to an inner peripheral surface of the pump cover 20. The positioning rib 11d relatively axially aligns the pump cover 20 and the support member 10. A slight gap may be provided between an outer peripheral surface of the positioning rib 11d and an inner peripheral surface of the pump cover 20. In this case, the pump cover 20 and the support member 10 are axially aligned while allowing an assembly error within a range of the gap.

As illustrated in FIG. 2, the fixed shaft 40 extends in the axial direction. The fixed shaft 40 includes a shaft main body portion 41 having a cylindrical shape extending in the axial direction about the central axis J, and a holding member 42 arranged on the second side in the axial direction of the shaft main body portion 41. The shaft main body portion 41 and the holding member 42 are made from a metal material having excellent thermal conductivity.

A screw hole 41h is provided in a lower end surface of the shaft main body portion 41. The screw hole 41h extends in the axial direction around the central axis J. A retaining screw 69 is inserted into the screw hole 41h. The retaining screw 69 prevents the pump unit 60 from being detached downward.

A retaining recessed portion 61 is provided at the center of the pump unit 60. The retaining recessed portion 61 opens downward. The retaining recessed portion 61 has a retaining surface 61p facing downward as a bottom surface. The retaining screw 69 described above is arranged inside the retaining recessed portion 61. A seat surface of the head of the retaining screw 69 and the retaining surface 61p of the retaining recessed portion 61 of the pump unit 60 face each other in the axial direction with a washer 68 interposed between them.

A lower end surface of the shaft main body portion 41, the retaining screw 69, and the washer 68 are exposed in a flow path of fluid pressure-fed by the pump unit 60. Therefore, the fixed shaft 40, the retaining screw 69, and the washer 68 are brought into contact with water (liquid) flowing into the pump unit 60 and are water-cooled. For this reason, heat transferred from the circuit board 80 to the fixed shaft 40 can be released to water to efficiently cool the circuit board 80.

Figure 5:
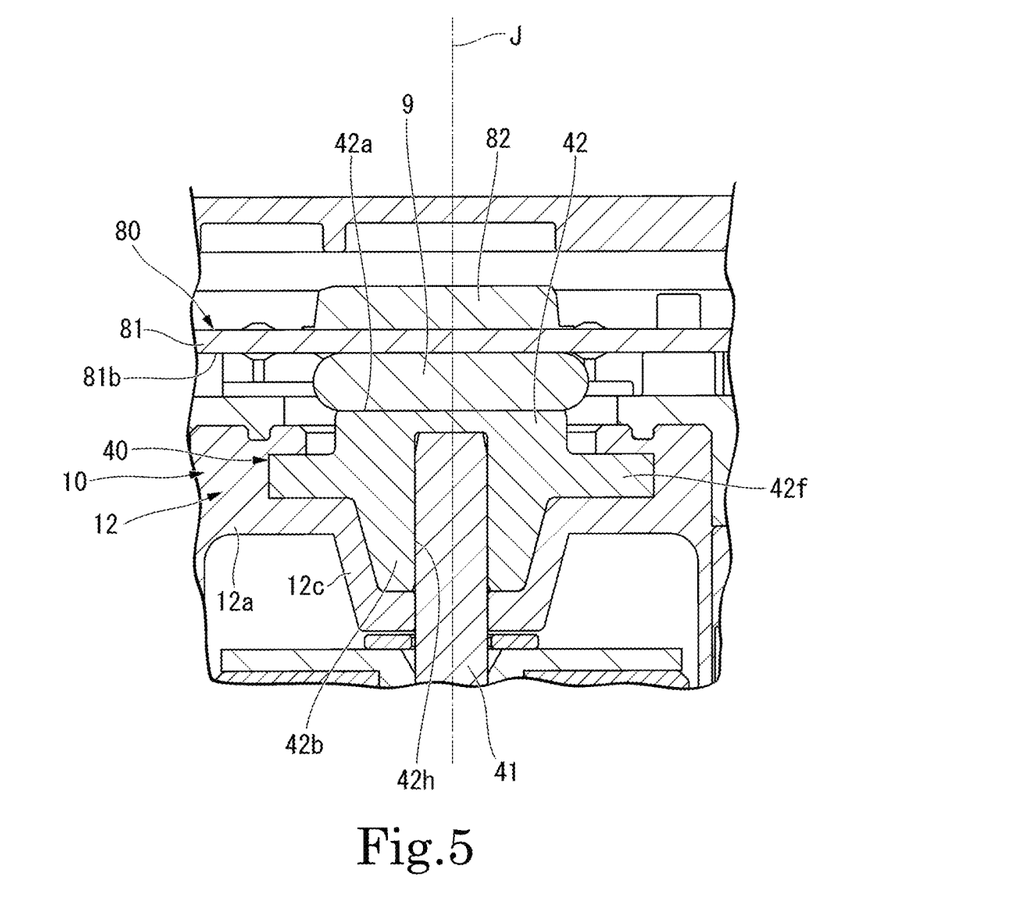
FIG. 5 is a partially enlarged view of FIG. 2.

As illustrated in FIG. 5, the holding member 42 is arranged on the upper side (the second side in the axial direction) of the shaft main body portion 41. The holding member 42 includes a holding member main body 42b and a holding member flange portion (flange portion) 42f extending radially outward from the holding member main body 42b. The holding member main body 42b is provided with a holding hole portion 42h that opens downward. An upper end portion of the shaft main body portion 41 is fitted into the holding hole portion 42h. In this manner, the shaft main body portion 41 is fixed to the holding member 42.

According to the present embodiment, the fixed shaft 40 includes the shaft main body portion 41 and the holding member 42 fixed to each other. For this reason, the fixed shaft 40 can be manufactured by assembling the shaft main body portion 41 and the holding member 42 which are separately manufactured, and the fixed shaft 40 can be manufactured at low cost.

The holding member 42 is embedded in the lid portion 12a of the support member 10 by insert molding.

More specifically, the holding member flange portion 42f of the holding member 42 is embedded in the holding portion 12c of the lid portion 12a. In this manner, the fixed shaft 40 is supported by the lid portion 12a. According to the present embodiment, since the holding member flange portion 42f is embedded in the holding portion 12c, the holding member flange portion 42f is caught by the holding portion 12c by a large area in the axial direction. In this manner, it is possible to prevent the holding member flange portion 42f from coming out of the holding portion 12c downward.

The holding member flange portion 42f extends radially outward with respect to the shaft main body portion 41. The holding member flange portion 42f is subjected to surface treatment, so that adhesion to a resin material constituting the holding portion 12c is enhanced. In this manner, entry of moisture into an interface between the holding member 42 and the holding portion 12c is suppressed. Therefore, moisture does not reach the upper side of the lid portion 12a from the inside of the rotor accommodating portion 12.

The holding member 42 has an exposed portion 42a exposed to the upper side (the second side in the axial direction) with respect to the lid portion 12a. That is, the fixed shaft 40 has the exposed portion 42a. The exposed portion 42a extends along a plane that is an upper surface of the holding member main body 42b and orthogonal to the central axis J. The exposed portion 42a extends along a plane orthogonal to the central axis J. The exposed portion 42a faces the circuit board 80 located above the lid portion 12a.

A heat conductive material 9 is sandwiched between the exposed portion 42a and the circuit board 80. The heat conductive material 9 of the present embodiment is a sheet-like heat dissipation sheet. As a material of the heat conductive material 9, a silicon-based material or the like is used. The heat conductive material 9 may be heat dissipation grease or heat dissipation gel.

The heat conductive material 9 is in contact with the exposed portion 42a. The heat conductive material 9 is in contact with the lower surface 81b of the substrate main body 81 of the circuit board 80. The heat conductive material 9 transfers heat of the circuit board 80 to the fixed shaft 40.

According to the present embodiment, the heat conductive material 9 transfers heat generated in the circuit board 80 to the fixed shaft 40 via the heat conductive material 9. The fixed shaft 40 has a sufficiently large heat capacity as compared with the heat generating element 82 and the substrate main body 81. Further, the fixed shaft 40 is cooled in contact with water (liquid) discharged by the pump unit 60. For this reason, according to the present embodiment, the circuit board 80 can be effectively cooled, and reliability of operation of the circuit board 80 can be enhanced.

According to the present embodiment, the circuit board 80 is cooled using the fixed shaft 40 provided inside the pump 1. For this reason, the entire pump 1 can be downsized in the axial direction as compared with a case where a heat sink is also used on the upper side of the circuit board 80. In addition, as compared with the case of using a heat sink, a seal structure around the heat sink can be omitted, and manufacturing cost can be reduced.

In the present embodiment, the heat generating element 82, the heat conductive material 9, and the exposed portion 42a overlap each other when viewed from the axial direction. For this reason, heat generated by the heat generating element 82 can be transferred to the exposed portion 42a of the fixed shaft 40 via the substrate main body 81 and the heat conductive material 9 in a shortest distance, and the heat generating element 82 can be efficiently cooled by the fixed shaft 40.

Figure 8:
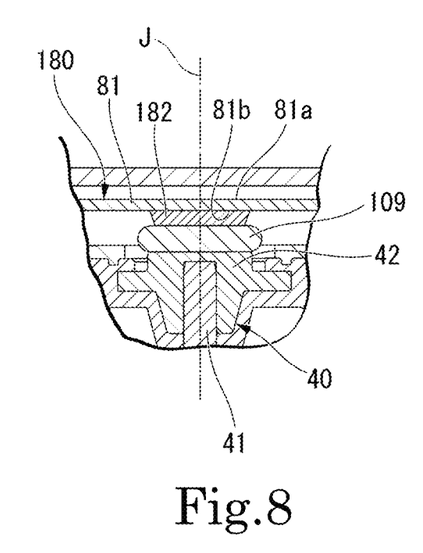
FIG. 8 is a partial cross-sectional view of the pump according to a variation.

In the present embodiment, the case where the heat generating element 82 is mounted on the upper surface 81a of the substrate main body 81 is described. In this case, heat of the heat generating element 82 is transferred to the heat conductive material 9 via the circuit board. On the other hand, as illustrated in FIG. 8 as a variation, the heat generating element 82 may be mounted on the lower surface 81b (surface on the first side in the axial direction) of the substrate main body 81. In this variation, a heat conductive material 109 is in direct contact with the heat generating element. For this reason, heat of the heat generating element can be directly transferred to the heat conductive material 109, and cooling efficiency of the heat generating element 82 can be enhanced.

As illustrated in FIG. 2, the rotor 50 is accommodated inside the rotor accommodating portion 12. The rotor 50 is rotatable about the central axis J. The rotor 50 includes a rotor core 51, a magnet 52, a first covering portion 54, and a resin portion 53.

The rotor core 51 has an annular shape surrounding the central axis J. The fixed shaft 40 axially passes through the radially inner side of the rotor core 51. The magnet 52 is fixed to the rotor core 51. In the present embodiment, the magnet 52 is arranged on an outer peripheral surface of the rotor core 51. For example, a plurality of magnets 52 are provided at intervals in the circumferential direction. The first covering portion 54 fixes the rotor core 51 and the plurality of magnets 52 to each other. The first covering portion 54, the rotor core 51, and the magnet 52 constitute a rotor assembly 55.

The resin portion 53 has a cylindrical shape surrounding the central axis J and extending in the axial direction. The fixed shaft 40 passes through the radially inner side of the resin portion 53 in the axial direction. The fixed shaft 40 is inserted radially inside the resin portion 53. The fixed shaft 40 rotatably supports the rotor 50 by supporting an inner peripheral surface of the resin portion 53.

The resin portion 53 includes a second covering portion 53a that embeds and holds the rotor assembly 55, and an extending portion 53b extending downward from the second covering portion 53a. The second covering portion 53a has a portion positioned between the fixed shaft 40 and the rotor core 51 in the radial direction. An end portion on the lower side of the extending portion 53b protrudes further downward than the rotor accommodating portion 12. The retaining recessed portion 61 is provided in a lower end portion of the extending portion 53b. As described above, the retaining screw 69 that suppresses detachment of the rotor 50 and the pump unit 60 is arranged inside the retaining recessed portion 61.

An outer peripheral surface of the resin portion 53 is an outer peripheral surface of the rotor 50. The outer peripheral surface of the resin portion 53 is located radially inward away from an inner peripheral surface of the rotor accommodating portion 12. An outer peripheral surface of the second covering portion 53a faces an inner peripheral surface of the rotor accommodating portion 12 with a slight gap interposed between them.

The pump unit 60 is connected to the lower side (the first side in the axial direction) of the rotor 50. In the present embodiment, the pump unit 60 is an impeller. The pump unit 60 is made from resin.

The pump unit 60 includes an impeller main body portion 62 connected to a lower end portion of the extending portion 53b of the rotor 50. The resin portion 53 and the impeller main body portion 62 are a part of the same single member. A portion made from resin including the resin portion 53 and the impeller main body portion 62 is formed by, for example, insert molding using the rotor assembly 55 as an insert member.

The impeller main body portion 62 includes a base plate portion 62a, a shroud plate portion 62b, a plurality of blade portions 62c, and a cylindrical portion 62d.

The base plate portion 62a and the shroud plate portion 62b are circular when viewed from the axial direction. The base plate portion 62a expands radially outward from an outer peripheral surface of the extending portion 53b. The shroud plate portion 62b expands radially outward along a plate surface of the base plate portion 62a below the base plate portion 62a.

The cylindrical portion 62d extends along the axial direction about the central axis J. The cylindrical portion 62d surrounds the extending portion 53b from the radially outer side. The inside of the cylindrical portion 62d is continuous with a space between the base plate portion 62a and the shroud plate portion 62b. The blade portion 62c connects the base plate portion 62a and the shroud plate portion 62b. The blade portion 62c extends along the radial direction. When the pump unit 60 rotates, a plurality of blade portions 62c feed liquid between the blade portions 62c radially outward.

The pump unit 60 has a suction port 64 for sucking water (liquid) and a discharge port 65 for discharging water (liquid). The suction port 64 faces downward and faces the inlet pipe 26 in the axial direction. On the other hand, the discharge port 65 faces radially outside and faces the outlet pipe 27 (see FIG. 1) in the radial direction.

The suction port 64 is provided in an end portion on the lower side of the cylindrical portion 62*d*. The suction port 64 opens downward. Meanwhile, the discharge port 65 is provided between the base plate portion 62*a* and the shroud plate portion 62*b* in the axial direction. The discharge port 65 opens radially outward. The pump unit 60 is rotated about the central axis J by the rotor 50 to suck water from the suction port 64 to the inside and discharge the water from the discharge port 65 to feed the water. The water sent by the pump unit 60 also flows into the rotor accommodating portion 12.

Figure 3:
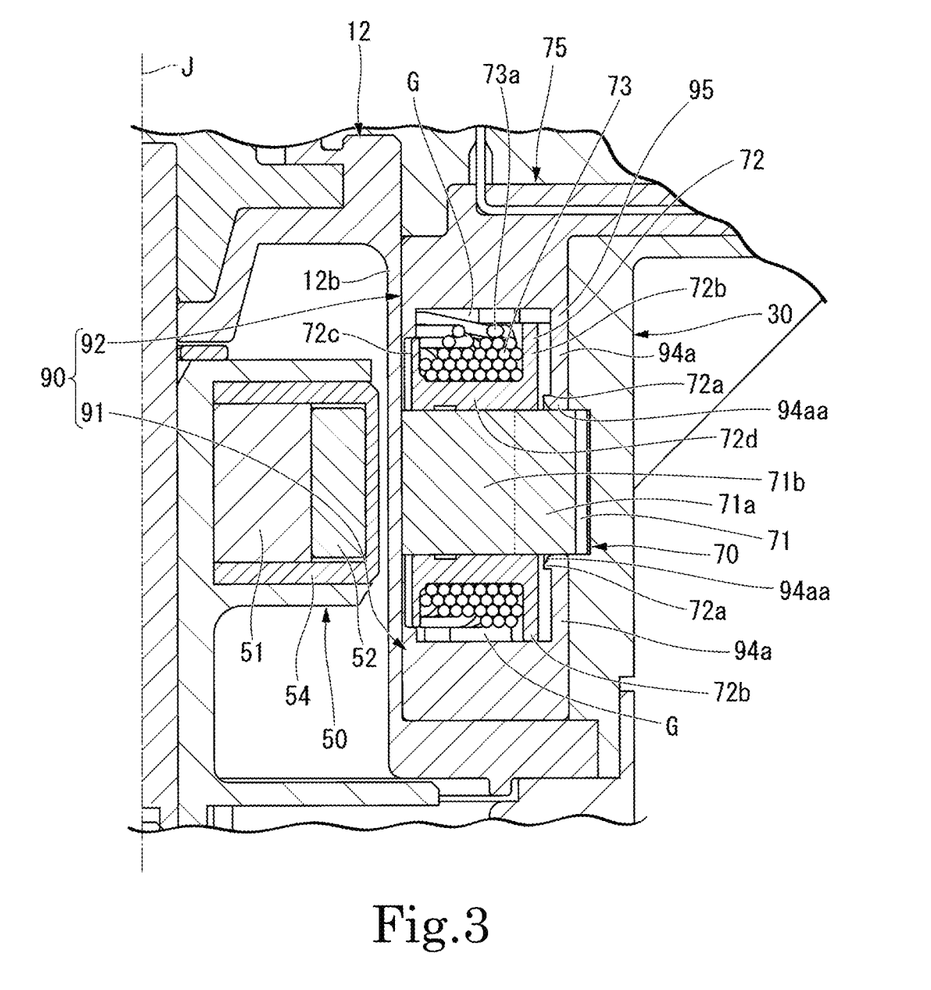
FIG. 3 is a partially enlarged view of FIG. 2.

As illustrated in FIG. 3, the stator assembly 75 includes a stator core 71 having an annular shape, a plurality of coils 73 mounted on the stator core 71, a plurality of insulators 72 interposed between the stator core 71 and the plurality of coils 73, and a stator cover 90. In the stator 70, the stator core 71, the plurality of coils 73, and the plurality of insulators 72 constitute the stator 70. That is, the stator assembly 75 includes the stator 70 and the stator cover 90.

The stator 70 is located radially outside the rotor 50 and surrounds the rotor 50. The stator 70 has an annular shape surrounding the rotor accommodating portion 12 and the rotor 50 on the radially outer side of the rotor accommodating portion 12. The stator 70 includes the stator core 71, the insulator 72 attached to the stator core 71, and the plurality of coils 73 attached to the stator core 71 with the insulator 72 interposed between them.

The stator core 71 is located radially outside the rotor accommodating portion 12 and surrounds the rotor core 51. The stator core 71 has a core back 71*a* having an annular shape surrounding the rotor core 51 and a plurality of teeth 71*b* extending radially inward from the core back 71*a*. Although not illustrated, the plurality of teeth 71*b* are arranged side by side along the circumferential direction.

An end portion on the radially inner side of the plurality of teeth 71*b* faces an outer peripheral surface of the tubular portion 12*b* in the rotor accommodating portion 12 with a slight gap interposed between them. That is, in the present embodiment, the stator 70 is arranged in a non-contact state with the outer peripheral surface of the tubular portion 12*b*.

Figure 4:
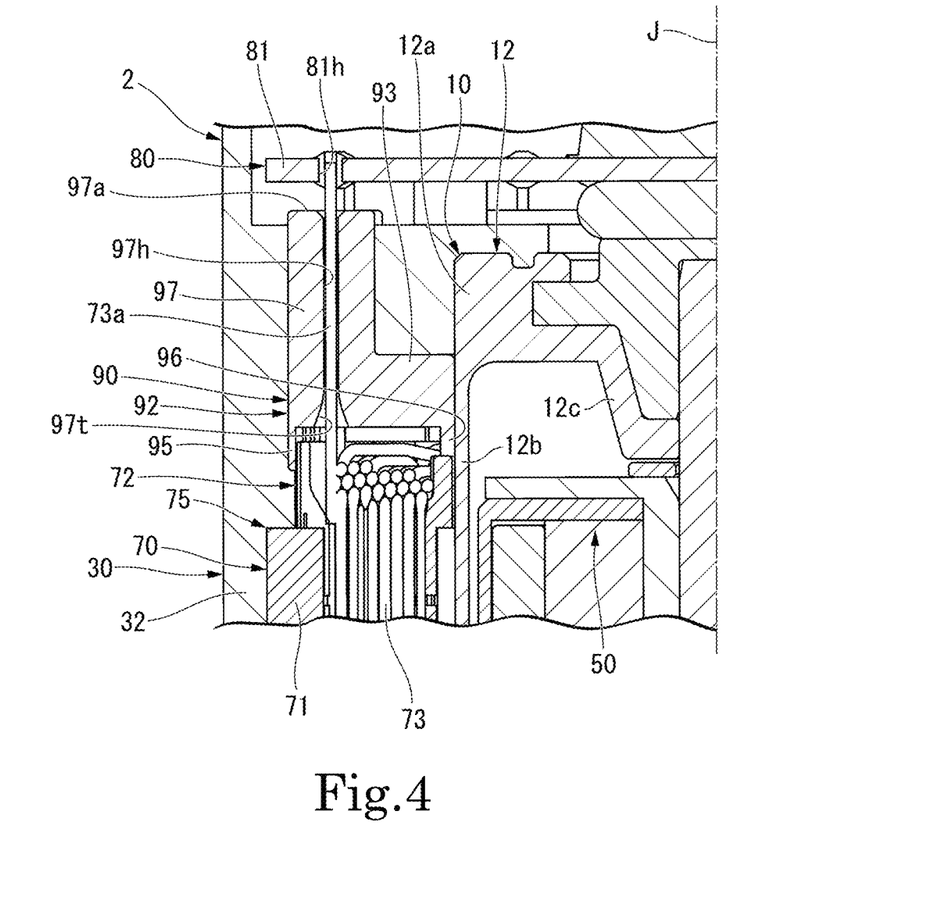
FIG. 4 is a partially enlarged view of FIG. 2.

As illustrated in FIG. 4, the coil 73 is configured by winding the coil wire 73*a* around the teeth 71*b*. The insulator 72 is interposed between the coil 73 and the teeth 71*b*. An end portion of the coil wire 73*a* extends upward from the coil 73. The extended coil wire 73*a* is connected to the circuit board 80. The number of the coils 73 provided in the stator 70 is the same as that of the teeth 71*b*.

As illustrated in FIG. 3, the insulator 72 is attached to the teeth 71*b*. The insulator 72 covers an outer peripheral surface of the teeth 71*b*. The insulator 72 of the present embodiment can be divided in the vertical direction. The insulator 72 is assembled to the teeth 71*b* from the vertical direction. The insulator 72 of the present embodiment is attached to each of the teeth 71*b*. The number of the insulators 72 provided on the stator 70 is the same as that of the teeth 71*b*.

The insulator 72 includes a surrounding portion 72*d* arranged between the coil 73 and the teeth 71*b*, an outer wall portion 72*b* located radially outside the coil 73, and an inner wall portion 72*c* located radially inside the coil 73. The surrounding portion 72*d* has a rectangular tubular shape that covers an outer peripheral surface of the teeth 71*b*. The outer wall portion 72*b* and the inner wall portion 72*c* sandwich the coil 73 from both sides in the radial direction.

Figure 7:
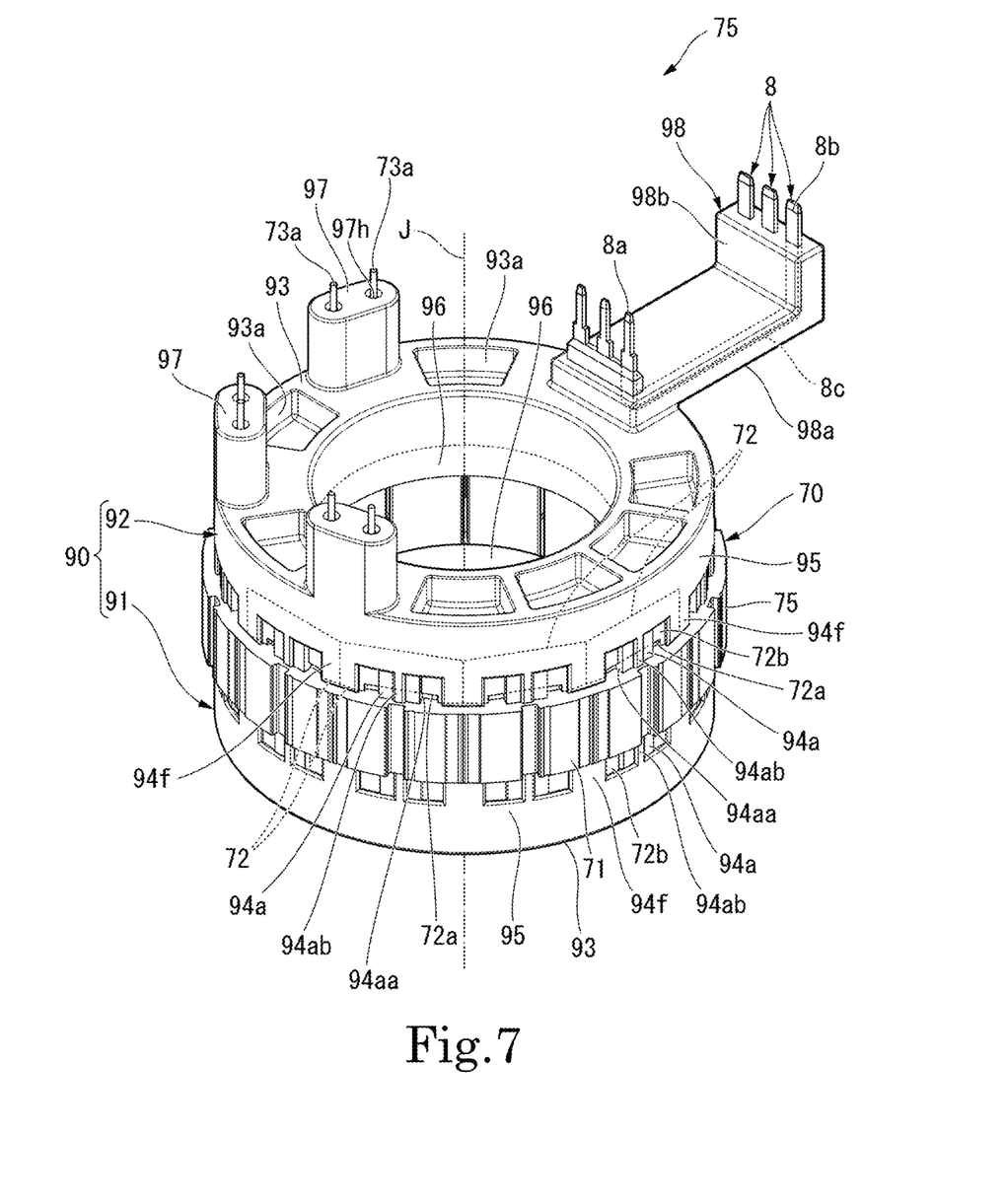
FIG. 7 is a perspective view of a stator assembly according to the embodiment.

FIG. 7 is a perspective view of the stator assembly 75 of the present embodiment.

As illustrated in FIGS. 3 and 7, a stepped portion 72*a* is provided on an outer surface of the outer wall portion 72*b* facing radially outward. The stepped portion 72*a* is provided on each of the upper side and the lower side of the stator core 71. The stepped portion 72*a* is recessed radially inward with respect to an outer surface of the outer wall portion 72*b*. The stepped portion 72*a* is a stepped surface facing the stator core 71 side.

As illustrated in FIG. 3, two of the stepped portions 72*a* are provided in one of the insulators 72. One of two of the stepped portions 72*a* is located on the lower side of the stator core 71, and the other is located on the upper side of the stator core 71. As illustrated in FIG. 7, the plurality of insulators 72 are arranged in the circumferential direction. Therefore, the plurality of stepped portions 72*a* are arranged at equal intervals in the circumferential direction on the upper side and the lower side of the stator core 71.

As illustrated in FIG. 3, the stator cover 90 covers the plurality of coils 73. As described above, the coil 73 is arranged between the outer wall portion 72*b* and the inner wall portion 72*c* of the insulator 72. Further, the coil 73 is exposed to the upper side and the lower side with respect to the insulator 72.

The stator cover 90 is arranged so as to extend between the outer wall portion 72*b* and the inner wall portion 72*c* of the insulator 72.

The stator cover 90 includes a first cover body 91 having an annular shape that covers the coil 73 from the lower side (the first side in the axial direction) and a second cover body 92 having an annular shape that covers the coil 73 from the upper side (the second side in the axial direction).

According to the present embodiment, since the stator cover 90 covers the coil 73, the coil 73 can be protected from a molten resin material during molding of the resin housing 30. Generally, an insulating film is provided on a surface of the coil wire 73*a*. According to the present embodiment, it is possible to suppress damage to the insulating film of the coil wire 73*a* due to heat and injection pressure of molten resin during molding of the resin housing 30.

In the present embodiment, a gap G is provided between the stator cover 90 and the coil 73. That is, according to the present embodiment, an air layer is provided between the resin housing 30 and the coil 73, and heat of molten resin during molding is hardly transferred to the coil 73. In this manner, damage to the insulation film of the coil wire 73*a* can be more reliably suppressed.

In general, since the coil 73 is configured by winding the coil wire 73*a*, an outer shape is hardly stabilized. According to the present embodiment, since the gap G is provided between the stator cover 90 and the coil 73, the stator cover 90 can be assembled to the stator 70 without depending on a shape of the coil 73.

Since an outer shape of the coil wire 73*a* is exposed, a surface of the coil 73 has a complicated uneven shape. For this reason, in a case where a surface of the coil 73 is molded with the resin housing 30, molten resin is less likely to wrap around a gap between the coil wires 73*a*, and a sink mark or the like is likely to be generated inside the resin housing 30. Further, since a surface of the coil 73 has a complicated uneven shape, it is difficult to control thickness of the resin housing 30, and there is a problem that dimensional accuracy hardly stabilizes.

According to the present embodiment, the resin housing 30 does not cover a surface of the coil 73 but covers the stator cover 90. That is, as mold resin does not need to cover a complicated uneven shape, a sink mark of the resin housing 30 can be suppressed, and dimensional accuracy can be stabilized.

According to the present embodiment, when the resin housing 30 is molded, a melted resin material covers surfaces of the stator cover 90 and the stator core 71. In this manner, each part of the stator 70 can be sealed from the outside. Furthermore, the stator cover 90 is firmly fixed to the stator core 71, and reliability of protection of the coil 73 by the stator cover 90 can be enhanced.

According to the present embodiment, the stator cover 90 includes a pair of the cover bodies 91 and 92 that cover the coil 73 from the lower side and the upper side, respectively. For this reason, the stator cover 90 can be easily assembled to the stator 70. Further, the stator cover 90 can effectively cover an exposed portion of the coil 73 from the vertical direction by a pair of the cover bodies 91 and 92.

As illustrated in FIG. 7, each of the first cover body 91 and the second cover body 92 includes an annular main body portion 93, an outer tubular portion 95, an inner tubular portion 96, a plurality of locking portions 94a, and a plurality of sealing wall portions 94f. The second cover body 92 further includes a plurality of columnar portions 97 and a terminal holding portion 98. That is, the stator cover 90 includes the annular main body portion 93, the outer tubular portion 95, the inner tubular portion 96, the locking portion 94a, the sealing wall portion 94f, the columnar portion 97, and the terminal holding portion 98.

The annular main body portion 93 has an annular shape around the central axis J. The annular main body portion 93 has a plurality of punched portions 93a. The punched portion 93a opens on a surface of the annular main body portion 93 facing the side opposite to the stator core 71. The annular main body portion 93 of the first cover body 91 is located below the coil 73, and the annular main body portion 93 of the second cover body 92 is located above the coil 73.

As illustrated in FIG. 4, the outer tubular portion 95 extends from an outer edge of the annular main body portion 93 to the stator core 71 side. Each of the outer tubular portion 95 and the inner tubular portion 96 has a cylindrical shape around the central axis J.

On the other hand, the inner tubular portion 96 extends from an inner edge of the annular main body portion 93 to the stator core 71 side. The outer tubular portion 95 and the inner tubular portion 96 of the first cover body 91 extend upward from the annular main body portion 93. The outer tubular portion 95 and the inner tubular portion 96 of the second cover body 92 extend downward from the annular main body portion 93. In description below, a tip portion of the outer tubular portion 95 or the inner tubular portion 96 means an end portion on the stator core 71 side in the axial direction.

The inner tubular portion 96 overlaps the inner wall portion 72c of the insulator 72 when viewed from the axial direction. A tip portion of the inner tubular portion 96 is in contact with an end surface of the inner wall portion 72c facing the axial direction. The inner tubular portion 96 is located radially inside the coil 73. An inner peripheral surface of the inner tubular portion 96 facing radially inward is continuous with an inner surface of the inner wall portion 72c facing radially inward. The inner peripheral surface of the inner tubular portion 96 and the inner side surface of the inner wall portion 72c are fitted to an outer peripheral surface of the tubular portion 12b of the rotor accommodating portion 12.

According to the present embodiment, an outer peripheral surface of the tubular portion 12b of the support member 10 is fitted to the inner tubular portion 96.

A gap between the inner tubular portion 96 and the tubular portion 12b is sufficiently small to the extent that molten resin during molding does not pass through the gap. For this reason, it is possible to prevent the molten resin from flowing from the radially inner side of the inner tubular portion 96 to the coil 73 side (that is, the gap G) during molding of the resin housing 30. As a result, it is possible to separate the coil 73 from the resin housing 30 to protect the coil 73.

The outer tubular portion 95 is arranged radially outside the outer wall portion 72b of the insulator 72. The outer tubular portion 95 covers the vicinity of an upper end portion of an outer surface of the outer wall portion 72b from the radially outer side. A tip portion of the outer tubular portion 95 faces an end face of the stator core 71 with a gap interposed between them.

As illustrated in FIG. 3, the locking portion 94a extends from the tip portion of the outer tubular portion 95 to the stator core 71 side. The locking portion 94a of the first cover body 91 extends upward from an upper end portion of the outer tubular portion 95. The locking portion 94a of the second cover body 92 extends downward from a lower end portion of the outer tubular portion 95.

The locking portion 94a extends along the outer wall portion 72b of the insulator 72. A claw portion 94aa is provided in a tip portion of the locking portion 94a. The claw portion 94aa is locked to the stepped portion 72a provided on an outer surface of the outer wall portion 72b. That is, the cover bodies 91 and 92 have a plurality of claw portions 94aa extending toward the stator core 71 side and locked to the insulator 72.

As illustrated in FIG. 7, the locking portions 94a are arranged at equal intervals along the circumferential direction. The first cover body 91 and the second cover body 92 of the present embodiment are provided with the locking portions 94a as many as the insulators 72. Each of the locking portions 94a is locked to one of the stepped portions 72a provided on the insulator 72.

According to the present embodiment, the first cover body 91 and the second cover body 92 are assembled to the stator 70 from the vertical direction. The locking portion 94a functions as a snap-fit. For this reason, in an assembling process, the locking portion 94a is elastically deformed radially outward until the claw portion 94aa reaches the stepped portion 72a in the assembling process. A reinforcing rib 94ab is provided on an outer surface of the locking portion 94a. The reinforcing rib 94ab reinforces the locking portion 94a while securing an elastic modulus of the locking portion 94a toward the radial outside.

According to the present embodiment, the first cover body 91 and the second cover body 92 are locked and fixed to the stator 70. This makes it possible to suppress positional displacement of the first cover body 91 and the second cover body 92 with respect to the stator 70 during molding of the resin housing 30. Further, according to the present embodiment, since the first cover body 91 and the second cover body 92 are fixed to the stator 70 by a snap-fit, an assembly process of the stator assembly 75 can be simplified.

The sealing wall portion 94f extends from a tip portion of the outer tubular portion 95 to the stator core 71 side. The sealing wall portion 94f of the first cover body 91 extends upward from an upper end portion of the outer tubular portion 95. The sealing wall portion 94f of the second cover body 92 extends downward from a lower end portion of the outer tubular portion 95.

The sealing wall portion 94f has a plate shape with the radial direction as the thickness direction. The sealing wall portion 94f is arranged between the locking portions 94a adjacent to each other in the circumferential direction. That is, the sealing wall portion 94f is arranged between the claw portions 94aa in the circumferential direction. As described above, the insulators 72 are arranged in the circumferential direction. The outer wall portion 72b of one of the insulators 72 extends in an arc shape along the circumferential direction when viewed from the axial direction. The outer wall portions 72b of the insulators 72 arranged in the circumferential direction are continuous in the circumferential direction. In this manner, the outer wall portions 72b of the plurality of insulators 72 form a cylindrical shape. The sealing wall portion 94f covers a gap between the outer wall portions 72b of the insulators 72 arranged in the circumferential direction.

According to the present embodiment, the sealing wall portion 94f covers a space between the insulators 72 adjacent in the circumferential direction from the radial outside. For this reason, it is possible to prevent molten resin from flowing into the coil 73 side (that is, the gap G) from the gap between the insulators 72 during molding of the resin housing 30. As a result, it is possible to separate the coil 73 from the resin housing 30 to protect the coil 73.

When the resin housing 30 is molded, the first cover body 91 and the second cover body 92 are pressed against the stator core 71 side by resin pressure of molten resin. The locking portions 94a of the first cover body 91 and the second cover body 92 have low strength so as to be smoothly elastically deformed at the time of locking. In the present embodiment, a tip surface of the sealing wall portion 94f facing the axial direction is in contact with the stator core 71. For this reason, the sealing wall portion 94f can suppress damage to the locking portion 94a by receiving a force caused by the resin pressure applied to the first cover body 91 and the second cover body 92.

The columnar portion 97 extends upward from an upper surface of the annular main body portion 93 of the second cover body 92. Three of the columnar portions 97 are provided on the second cover body 92. Three of the columnar portions 97 are arranged along the circumferential direction.

A through hole (coil holding portion) 97h is opened on an upper surface of the columnar portion 97. That is, the through hole 97h is provided in the second cover body 92. In the present embodiment, two of the through holes 97h are opened in one of the columnar portions 97.

As illustrated in FIG. 4, the through hole 97h extends linearly in the axial direction. The through hole 97h extends over the annular main body portion 93 and the columnar portion 97 in the second cover body 92.

The coil wire 73a extending upward from the coil 73 is inserted through the through hole 97h. The through hole 97h functions as a coil holding portion that holds the coil wire 73a. That is, the stator cover 90 includes a coil holding portion (through hole 97h) that holds the coil wire.

In the present embodiment, holding the coil wire 73a means supporting the coil wire 73a along the axial direction to maintain the posture and position of the coil wire 73a. An inner peripheral surface of the through hole 97h may be in close contact with the coil wire 73a. A hole diameter of the through hole 97h is preferably 1.5 times or less a wire diameter of the coil wire 73a.

In the present embodiment, since the coil holding portion that holds the coil 73 is the through hole 97h, the entire outer periphery of the coil wire 73a can be surrounded, and the coil wire 73a can be stably held. However, the coil holding portion may be a notch or the like provided so as to be recessed radially inward from an outer peripheral portion of the second cover body 92.

The through hole 97h is provided with a tapered portion 97t whose cross-sectional area decreases toward the upper side (the second side in the axial direction). In the present embodiment, the tapered portion 97t is located in an end portion on the lower side of the through hole 97h. A cross-sectional shape of the through hole 97h is circular over the entire length including the tapered portion 97t. According to the present embodiment, when the stator cover 90 is assembled, an end portion of the coil wire 73a can be easily guided to the inside of the through hole 97h, and an assembly process of the stator assembly 75 can be facilitated.

In the present embodiment, the stator cover 90 holds the coil wire 73a drawn out from the coil 73 in the through hole 97h and connected to the circuit board 80. Accordingly, the stator cover 90 can position the coil wire 73a and facilitate a connecting process of the coil wire 73a to the circuit board 80.

In the present embodiment, the through hole 97h connects a space in which the coil 73 is accommodated and a space in which the circuit board 80 is accommodated in the case 2. For this reason, during molding of the resin housing 30, molten resin does not come into contact with the coil wire 73a drawn out from the coil 73. That is, the stator cover 90 can protect the drawn coil wire 73a from the molten resin in the through hole 97h.

The through hole 97h of the present embodiment overlaps the first through hole 81h of the circuit board 80 when viewed from the axial direction. For this reason, the coil wire 73a extending upward from the through hole 97h can be smoothly inserted into the first through hole 81h of the circuit board 80. Further, since the coil wire 73a is held by the through hole 97h, the coil wire 73a can be stably soldered to the first through hole 81h, and reliability of connection between the coil wire 73a and the circuit board 80 can be enhanced.

The through hole 97h of the present embodiment extends in the axial direction inside the columnar portion 97. The columnar portion 97 extends along the axial direction and penetrates the resin housing 30 in the axial direction. For this reason, the through hole 97h can be secured long, and reliability of holding of the coil wire 73a by the through hole 97h can be enhanced.

An upper end surface (tip surface) 97a of the columnar portion 97 is exposed to the upper side with respect to the resin housing 30.

The upper end surface 97a is covered with a mold during molding of the resin housing 30. The upper end surface 97a of the columnar portion 97 faces the circuit board 80, and an opening of the through hole 97h is provided. For this reason, during molding of the resin housing 30, molten resin does not enter the inside of the through hole 97h, and the coil wire 73a can be more reliably protected.

As illustrated in FIG. 7, the terminal holding portion 98 is arranged on an upper surface of the annular main body portion 93 of the second cover body 92. The terminal holding portion 98 includes a radially extending portion 98a extending radially outward with respect to the second cover body 92 and an upper protruding portion 98b extending upward from an end portion on the radially outer side of the radially extending portion 98a. The terminal holding portion 98 holds a plurality (three in the present embodiment) of the terminals 8 embedded in the terminal holding portion 98. The second cover body 92 is formed by insert molding in which the terminal 8 is inserted.

The terminal 8 includes a base portion 8c extending along the radial direction, a first end portion 8a extending upward from an end portion on the radially inner side of the base portion 8c, and a second end portion 8b extending upward from an end portion on the radially outer side of the base portion 8c. The base portion 8c extends along the radial direction inside the radially extending portion 98a of the terminal holding portion 98. The first end portion 8a protrudes upward from the radially extending portion 98a. The second end portion 8b extends upward along the upper protruding portion 98b and protrudes upward from an upper end surface of the upper protruding portion 98b.

As illustrated in FIG. 2, the first end portion 8a of the terminal 8 passes through the inside of the resin housing 30 and protrudes upward from the housing upper surface 30g. The first end portion 8a is inserted into the second through hole 81k of the circuit board 80 and connected to the circuit board 80 by soldering.

The second end portion 8b of the terminal 8 protrudes upward in the connector portion 39 of the resin housing 30. The connector portion 39 exposes the second end portion 8b of the terminal 8 and surrounds the periphery. The second end portion 8b is connected to the external device 7 connected to the connector portion 39. The external device 7 supplies power to the circuit board 80 via the terminal 8. Further, the circuit board 80 supplies power from the coil wire 73a to the coil 73.

According to the present embodiment, since the stator cover 90 includes the terminal holding portion 98, the terminal 8 can be held by the stator cover 90 in advance. For this reason, during formation of the resin housing 30, the terminal 8 can be easily embedded in the resin housing 30, and a manufacturing process can be simplified.

The pump cover 20 constitutes a lower end portion of the case 2. The pump cover 20 is located below (on the first side in the axial direction of) the motor 3, the resin housing 30, and the support member 10. The pump cover 20 covers the pump unit 60. The pump cover 20 includes a pump surrounding portion 22, an upper end tubular portion 21, the inlet pipe 26, and the outlet pipe 27 (see FIG. 1). The pump surrounding portion 22 covers the pump unit 60 from radially outside and below.

A flow path through which water (liquid) flows is provided inside the pump surrounding portion 22. The upper end tubular portion 21 extends upward from an upper end portion of the pump surrounding portion 22. The upper end tubular portion 21 has a tubular shape about the central axis J. The upper end tubular portion 21 surrounds an outer peripheral surface of the holding tubular portion 31 of the resin housing 30.

As illustrated in FIG. 1, the inlet pipe 26 extends downward from a lower end portion of the pump surrounding portion 22. Further, the outlet pipe 27 extends radially outward from an outer peripheral portion of the pump surrounding portion 22. The inlet pipe 26 and the outlet pipe 27 are connected to an internal space of the pump surrounding portion 22.

The pump cover 20 is joined to the resin housing 30 and the support member 10 by welding. Hereinafter, a joining configuration of the pump cover 20, the resin housing 30, and the support member 10 will be described. The pump cover 20 is welded to the resin housing 30 and the support member 10 by spin welding.

Figure 6:
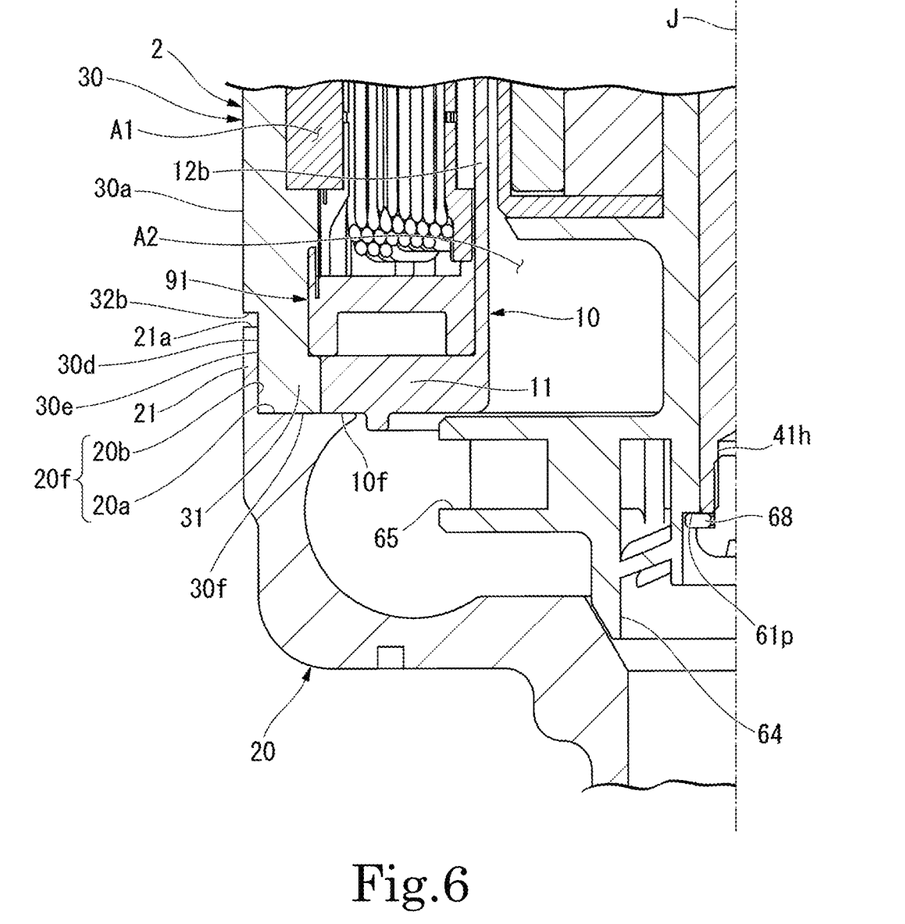
FIG. 6 is a partially enlarged view of FIG. 2.

As illustrated in FIG. 6, the pump cover 20 has a first contact surface 20f having an annular shape. The first contact surface 20f has a main region 20a facing the upper side (the second side in the axial direction) and a subregion 20b facing the radial inside. The main region 20a is an upper end surface of the pump surrounding portion 22. The subregion 20b is located on an inner peripheral surface of the upper end tubular portion 21. The main region 20a and the subregion 20b are connected to be orthogonal to each other. Both the main region 20a and the subregion 20b extend annularly along the circumferential direction around the central axis J.

The resin housing 30 has a second contact surface 30f and a fourth contact surface 30e in a lower end portion. The second contact surface 30f is a flat surface facing the lower side (the second side in the axial direction). On the other hand, the fourth contact surface 30e is a curved surface facing radially outward. The second contact surface 30f and the fourth contact surface 30e extend annularly along the circumferential direction around the central axis J. The second contact surface 30f is a lower end surface of the holding tubular portion 31. On the other hand, the fourth contact surface 30e is located on an outer peripheral surface of the holding tubular portion 31. That is, the second contact surface 30f and the fourth contact surface 30e are provided on the holding tubular portion 31. The second contact surface 30f is in contact with and welded to the main region 20a of the first contact surface 20f in the vertical direction. On the other hand, the fourth contact surface 30e is in contact with and welded to the subregion 20b of the first contact surface 20f in the radial direction.

The support member 10 has the third contact surface 10f in a lower end portion. The third contact surface 10f is a flat surface facing the lower side (the second side in the axial direction). The third contact surface 10f extends annularly along the circumferential direction around the central axis J. The third contact surface 10f is a lower end surface of the flange portion 11. That is, the third contact surface 10f is provided on the flange portion 11. The third contact surface 10f is in contact with and welded to the main region of the first contact surface 20f in the vertical direction. The third contact surface 10f is arranged adjacent to the radially inner side of the second contact surface 30f. The second contact surface 30f and the third contact surface 10f are arranged on the same plane orthogonal to the central axis J.

According to the present embodiment, the first contact surface 20f of the pump cover 20 is welded to the second contact surface 30f of the resin housing 30 and the third contact surface 10f of the support member 10. Since the first contact surface 20f is welded to the second contact surface 30f, the waterproof region A1 and the flow path region A2 inside the case 2 can be sealed with respect to the outside of the case 2. Further, since the first contact surface 20f is welded to the third contact surface 10f, the waterproof region A1 and the flow path region A2 can be sealed from each other inside the case 2. In this manner, it is possible to realize sealing of the pump 1 without using a sealing member such as an O-ring, and it is possible to reduce the number of parts and manufacture the pump 1 at low cost and with high reliability.

In addition, according to the present embodiment, the resin housing 30 and the support member 10 are welded to one contact surface (the first contact surface 20f) of the pump cover 20. For this reason, in one welding process, two members, the resin housing 30 and the support member 10, can be joined to the pump cover 20, and the welding process can be simplified.

According to the present embodiment, since the first contact surface 20*f* is annular, a welded portion can be arranged in an annular shape, and an inner region and an outer region of the welded portion can be sealed from each other. In addition, since the first contact surface 20*f* is annular, it is possible to employ spin welding in which the pump cover 20 is rotated with respect to the resin housing 30 and the support member 10 to weld contact surfaces to each other, and work efficiency of the welding process can be enhanced.

In the present embodiment, the case where the pump cover 20, the resin housing 30, and the support member 10 are joined by spin welding is exemplified, but other welding means may be employed. As an example, the pump cover 20, the resin housing 30, and the support member 10 may be welded by ultrasonic welding, laser welding, or the like.

According to the present embodiment, the first contact surface 20*f* faces upward, and the second contact surface 30*f* and the third contact surface 10*f* welded to the first contact surface 20*f* face downward. For this reason, welding can be performed while stress is applied in the axial direction to a contact portion between the first contact surface 20*f* and the second contact surface 30*f* and the third contact surface 10*f*, and welding efficiency in the case of employing spin welding can be enhanced.

As described above, the support member 10 is molded with the resin housing 30. For this reason, the support member 10 and the resin housing 30 are in close contact with each other, but are not joined together. Therefore, a minute gap is provided between the support member 10 and the resin housing 30.

In the present embodiment, the second contact surface 30*f* of the resin housing 30 and the third contact surface 10*f* of the support member 10 are arranged adjacent to each other in the radial direction. For this reason, a part of a resin material melted in a welding process enters a minute gap between the support member 10 and the resin housing 30 and is solidified. In this manner, sealing between the support member 10 and the resin housing 30 becomes possible, and a more reliable sealing structure can be realized.

As described above with reference to FIG. 1, the protruding portion 11*e* provided on an outer peripheral surface of the flange portion 11 is fitted into the recessed portion 31*e* of the holding tubular portion 31. According to the present embodiment, the protruding portion 11*e* and the recessed portion 31*e* function as a rotation stopper between the support member 10 and the resin housing 30. This makes it possible to suppress relative rotation of the resin housing 30 and the support member 10 in a welding process by spin welding.

According to the present embodiment, the protruding portion 11*e* and the recessed portion 31*e* are arranged along the circumferential direction and are fitted to each other. For this reason, a minute gap between the support member 10 and the resin housing 30 extends in a wave shape along the circumferential direction. A resin material melted by the spin welding spreads in the circumferential direction at an interfaces between the first contact surface 20*f* and the second contact surface 30*f* and the third contact surface 10*f* by rotation during the spin welding. According to the present embodiment, the gap between the support member 10 and the resin housing 30 is arranged in a wave shape along the circumferential direction, so that a resin material that melts during spin welding can be caused to effectively enter the gap and solidified, and a highly reliable sealing structure can be realized.

As illustrated in FIG. 6, the pump cover 20 of the present embodiment is welded to the fourth contact surface of the resin housing 30 in the subregion 20*b* of the first contact surface 20*f*. According to the present embodiment, it is possible to secure a wide area of a welding surface and further enhance reliability of sealing. In addition, the welded portion can have a complicated labyrinth structure, so that it is possible to enhance reliability of sealing and rigidity of the welded portion.

In the present embodiment, the pump cover 20 has an upper end surface 21*a* located at an upper end of the upper end tubular portion 21. The upper end surface 21*a* is an annular flat surface facing the upper side (the second side in the axial direction). A stepped portion 30*d* recessed downward and radially inward is provided in a lower end portion of the outer peripheral surface 30*a* of the resin housing 30. The upper end tubular portion 21 of the pump cover 20 is fitted into the stepped portion 30*d*.

The stepped portion 30*d* has a facing surface 32*b* facing downward. That is, the resin housing 30 has the facing surface 32*b*. The facing surface 32*b* faces the upper end surface 21*a* of the upper end tubular portion 21 with a gap interposed between them. According to the present embodiment, since a gap is provided between the facing surface 32*b* and the upper end surface 21*a*, even when a part of the first contact surface 20*f* and a part of the second contact surface 30*f* is melted in a welding process and the pump cover 20 and the resin housing 30 relatively approach each other in the axial direction, interference between the facing surface 32*b* and the upper end surface 21*a* can be suppressed.

In the present embodiment, the resin housing 30, the pump cover 20, and the support member 10 welded to each other are preferably made from the same kind of resin material. Similarly, the resin housing 30 and the substrate cover 28 which are welded to each other are preferably made from the same kind of resin material. By forming members to be welded from the same kind of resin material, it is possible to realize firm welding, thermal distortion is less likely to occur even after welding, and it is possible to suppress occurrence of damage to a welded portion.

Although various embodiments of the present invention are described above, configurations in the embodiments and a combination of the configurations are examples, and thus addition, omission, replacement of a configuration, and other modifications can be made within a range not deviating from the gist of the present invention. Further, the present invention is not to be limited by the embodiments.

For example, use of a pump to which the present invention is applied is not particularly limited. The pump may be mounted on any device. The pump may be mounted on a vehicle, for example. The pump may be a pump that sends any fluid. The pump may be an oil pump that sends oil. The configurations described in the present description can be appropriately combined within a range not contradictory to one another.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pump comprising:
a rotor rotatable about a central axis;
a stator assembly located radially outside the rotor and surrounding the rotor;
a pump unit connected to a first side in an axial direction of the rotor;
a support member including a rotor accommodating portion, the rotor accommodating portion being located radially inside the stator assembly and accommodating the rotor therein; and
a resin housing in which the stator assembly and the support member are molded,
wherein the rotor accommodating portion includes:
   a lid portion that covers the rotor from a second side in the axial direction, and
   a tubular portion that is located between the rotor and the stator assembly in a radial direction and is open to the first side in the axial direction, and
the stator assembly includes:
   a stator core having an annular shape,
   a plurality of coils mounted on the stator core, and
   a stator cover that covers the plurality of coils, wherein the stator cover includes a pair of cover bodies having an annular shape that cover the coil from the first side in the axial direction and the second side in the axial direction,
   a plurality of insulators interposed between the stator core and the plurality of coils, and
   each of the cover bodies includes a plurality of claw portions extending toward a stator core side and locked to the insulator
the cover body includes a sealing wall portion arranged between the claw portions in a circumferential direction,
the stator assembly includes the plurality of insulators arranged in the circumferential direction, and
the sealing wall portion covers a space between the insulators adjacent to each other in the circumferential direction from radially outside.

2. The pump according to claim 1, wherein a tip surface of the sealing wall portion facing the axial direction is in contact with the stator core.

3. The pump according to claim 1, wherein each of the cover bodies includes an inner tubular portion that is located radially inside the coil and to which an outer peripheral surface of the tubular portion is fitted.

4. The pump according to claim 1, wherein a gap is provided between the stator cover and the coil.

* * * * *